Mar. 6, 1923.
R. T. ROYE.
PIPE TONGS.
FILED APR. 18, 1922.
1,447,327.
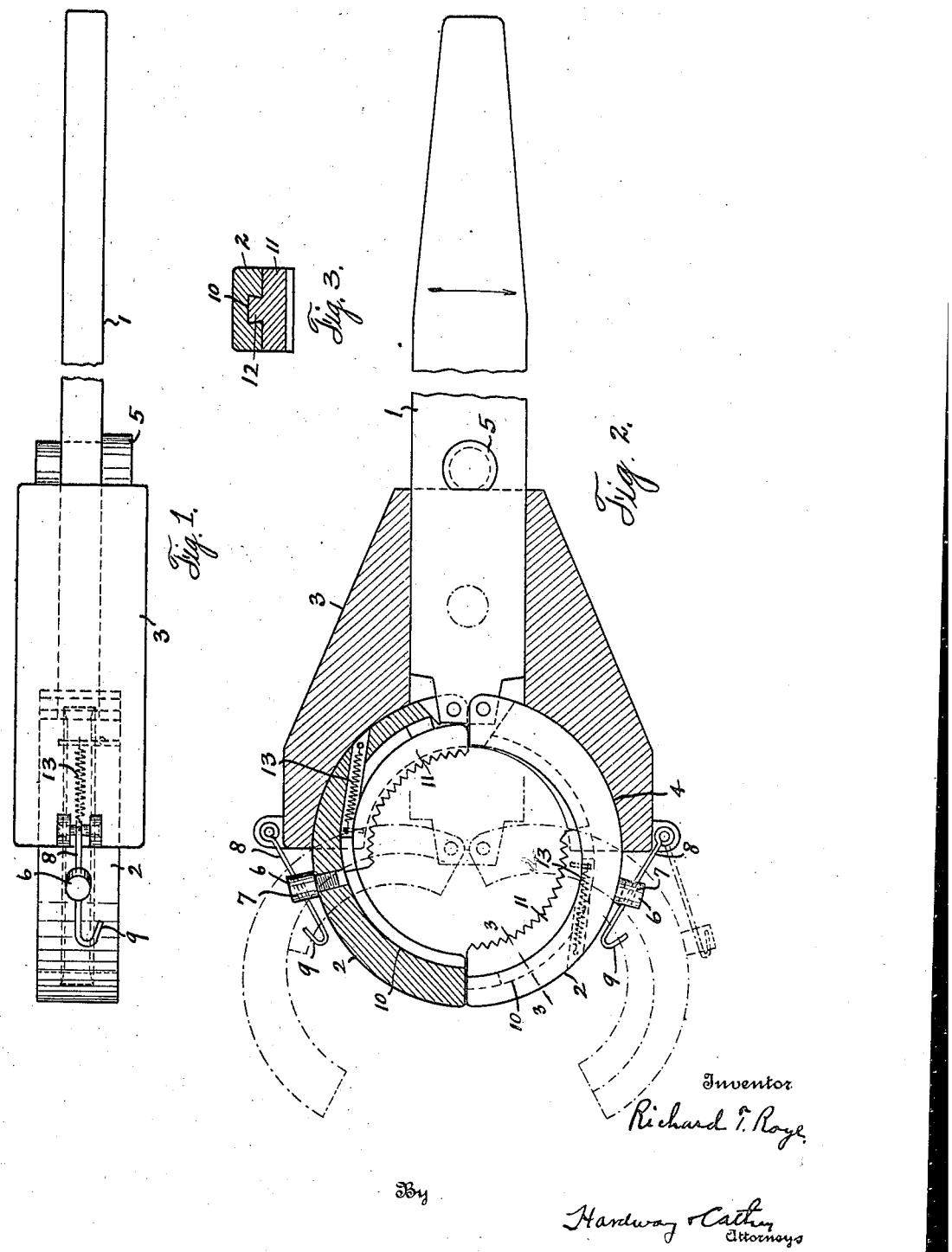

Patented Mar. 6, 1923.

1,447,327

UNITED STATES PATENT OFFICE.

RICHARD T. ROYE, OF HOUSTON, TEXAS, ASSIGNOR OF ONE-HALF TO W. L. PEARCE, OF HARRIS COUNTY, TEXAS.

PIPE TONGS.

Application filed April 18, 1922. Serial No. 555,333.

*To all whom it may concern:*

Be it known that I, RICHARD T. ROYE, a citizen of the United States, residing at Houston, in the county of Harris and State of Texas, have invented certain new and useful Improvements in a Pipe Tong, of which the following is a specification.

This invention relates to new and useful improvements in a pipe tong.

One object of the invention is to provide a tong which has been especially constructed for the purpose of engaging with and turning pipe and other round bodies.

Another object of the invention is to provide a tong which will readily engage with pipes of different sizes within a limited range.

A further feature of the invention resides in the provision of a tong which is of simple construction and may be cheaply and easily manufactured and which is effective in use.

With the above and other objects in view the invention has particular relation to certain novel features of construction, arrangement of parts, and use, an example of which is given in this specification and illustrated in the accompanying drawings, wherein:—

Figure 1 is a side view of the device.

Figure 2 is a plan view shown partly in a horizontal section and,

Figure 3 is a transverse sectional view taken on the line 3—3 of Figure 2.

In the drawings, the numeral 1 designates the handle to one end of which the arcuate clamp members 2, 2 are pivoted. Slidably mounted on the handle there is a housing 3 formed with an arcuate recess 4 in which the pivoted ends of the clamp members are adapted to seat. When said clamp members are seated in said recess they are thereby held in closed or clamped position around the pipe, and the housing may be secured in this position by means of a key 5, which is fitted through a keyway through the handle adjacent the outer end of the housing. Each clamp member 2 has an outwardly projecting stud 6 formed with a bearing 7. Through these bearings operate the respective rods 8 which are attached at one end to the housing 3 and whose other ends are formed into hooks 9. When it is desired to open the clamp members to engage them around the object to be turned the key 5 is removed and the housing is moved outwardly on the handle and the hooks 9 will engage with the studs 7 and swing the clamp members into open position and at the same time will prevent the housing from becoming detached from the handle.

The inner faces of the clamps 2 are cam shaped in form, reversely arranged and are provided with dove tailed grooves 10, and slidably mounted within each clamp there is a toothed arcuate cam shaped jaw 11, each jaw being formed with an external dove tailed rib 12, which has a bearing in the corresponding groove 10. When the tong is applied to the pipe the handle is manipulated in the direction indicated by the arrow in Figure 2, and the jaws will engage with said pipe and as the tong is turned the jaws 11 will be held stationary, the clamps 2 moving with the handle. As before stated the jaws are tapering, or cam shaped, their narrow ends looking in the same direction, and they are arranged reversely with respect to the cam faces of the clamps against which they bear so that as the tong is turned they will gradually contract and securely grip the pipe to be turned. This provision for contracting the jaws toward each other permits the tong to be applied to pipes of varying sizes. When the tong is released from the pipe the jaws will move back to their original position, under the influence of the pull springs 13, 13 which are housed within the respective clamp members, as shown, one end of each spring being attached to the corresponding jaw and the other end thereof being secured to the corresponding clamp member.

What I claim is:—

1. A tong including a handle, a pair of arcuate clamps pivoted to one end thereof the inner faces of said clamps being formed into reversely arranged cam faces, a pipe engaging jaw slidably mounted within each clamp, a housing slidably mounted on the handle and formed with an arcuate recess adapted to receive the pivoted ends of said clamps, when the housing is moved adjacent thereto, said housing when in said position locking said clamps around the pipe, and rods pivoted to the housing and having slidable engagement with the respective clamps.

2. A tong including a handle, a pair of arcuate clamps pivoted to one end thereof the inner faces of said clamps being formed into reversely arranged cam faces, a bearing carried by each clamp, a pipe engaging jaw slidably mounted within each clamp, a housing slidably mounted on the handle and formed with an arcuate recess adapted to receive the pivoted ends of said clamps, when the housing is moved adjacent thereto, said housing when in said position locking said clamps around the pipe, and means for locking said housing in said position, rods pivoted to the housing and slidable through the clamp bearings, and formed to engage therewith when the housing is moved outwardly on the handle.

3. A pipe tong including a handle, a pair of arcuate clamps pivoted to one end thereof, pipe engaging means carried by the clamps, a housing slidably mounted on the handle and formed to fit around the clamps to lock them in engagement around the pipe, means for locking said housing in position around said clamps, connecting members attached to the housing and having a slidable engagement with the respective clamps, and formed to engage therewith to swing the clamps into open position when the housing is moved outwardly on the handle.

In testimony whereof I have signed my name to this specification in the presence of two subscribing witnesses.

RICHARD T. ROYE.

Witnesses:
   JM. B. OLIVER,
   WM. A. CATHEY.